Feb. 21, 1956

B. H. KELLOGG 2,735,465

MACHINE FOR ORIENTING AND SLICING
OVALOIDAL FRUIT SUCH AS APRICOTS

Filed Dec. 17, 1949

FIG_1

Inventor
BRUCE H. KELLOGG

By Hans G. Hoffmeister
Attorney

Feb. 21, 1956

B. H. KELLOGG

2,735,465

MACHINE FOR ORIENTING AND SLICING
OVALOIDAL FRUIT SUCH AS APRICOTS

Filed Dec. 17, 1949

FIG_3A

FIG_10

FIG_11

FIG_12

FIG_9

Inventor
BRUCE H. KELLOGG

By Hans G. Hoffmeister
Attorney

United States Patent Office 2,735,465
Patented Feb. 21, 1956

2,735,465

MACHINE FOR ORIENTING AND SLICING OVALOIDAL FRUIT SUCH AS APRICOTS

Bruce H. Kellogg, Los Gatos, Calif., assignor to Food Machinery and Chemical Corporation, San Jose, Calif., a corporation of Delaware Application December 17, 1949, Serial No. 133,648

15 Claims. (Cl. 146—72)

The present invention relates to machines for aligning ovaloidal fruit such as apricots, prunes and the like. Fruit of this type has a suture membrane that lies within its largest cross-sectional plane and divides the fruit into its natural halves. In cutting such fruit for canning or drying it is highly desirable that the fruit be cut along its suture plane not only for reasons of appearance but also for the reason that the major perimeter of the fruit pit lies within the stuture plane so that the pit cavities of fruit halved in this manner are relatively shallow which makes it easy to remove the pit from the fruit halves.

It is an object of the present invention to provide a simple and efficient machine for orienting ovaloidal fruit, such as apricots and the like, in such a manner that its largest cross-sectional contour is contained within a predetermined plane.

Another object is to provide a machine for orienting long-shaped or ovaloidal fruit in such a manner that its suture membrane lies within a predetermined vertical plane.

Additionally, it is an object to provide a machine of the type referred to that will properly align ovaloidal fruit, such as apricots or prunes, within a minimum of time and space.

Still another object is to provide a machine automatically effective to cut ovaloidal fruit such as apricots, prunes and the like delivered at random thereto, into their natural halves.

Furthermore, it is an object to provide means for delivering individual specimens of ovaloidal fruit, such as apricots, in properly spaced intervals from a promiscuous mass onto an aligning and cutting machine of the type referred to.

An additional object is to provide a fruit-cutting mechanism for cooperation with a fruit-orienting mechanism of the type described that will not upset the previously established orientation of the fruit.

Moreover it is an object to provide a fruit-cutting mechanism of the type referred to that may readily be adjusted to handle fruit of different sizes.

Furthermore, it is an object to provide a fruit-cutting mechanism that adapts itself automatically to the natural variations in size of a particular type of fruit.

These and other objects of my invention will be apparent from the following description of the accompanying drawings which illustrate a preferred embodiment thereof and wherein:

Figure 8 is a fragmentary side elevation of said discharge end viewed in the direction opposite to Figure 1.

Figure 1:
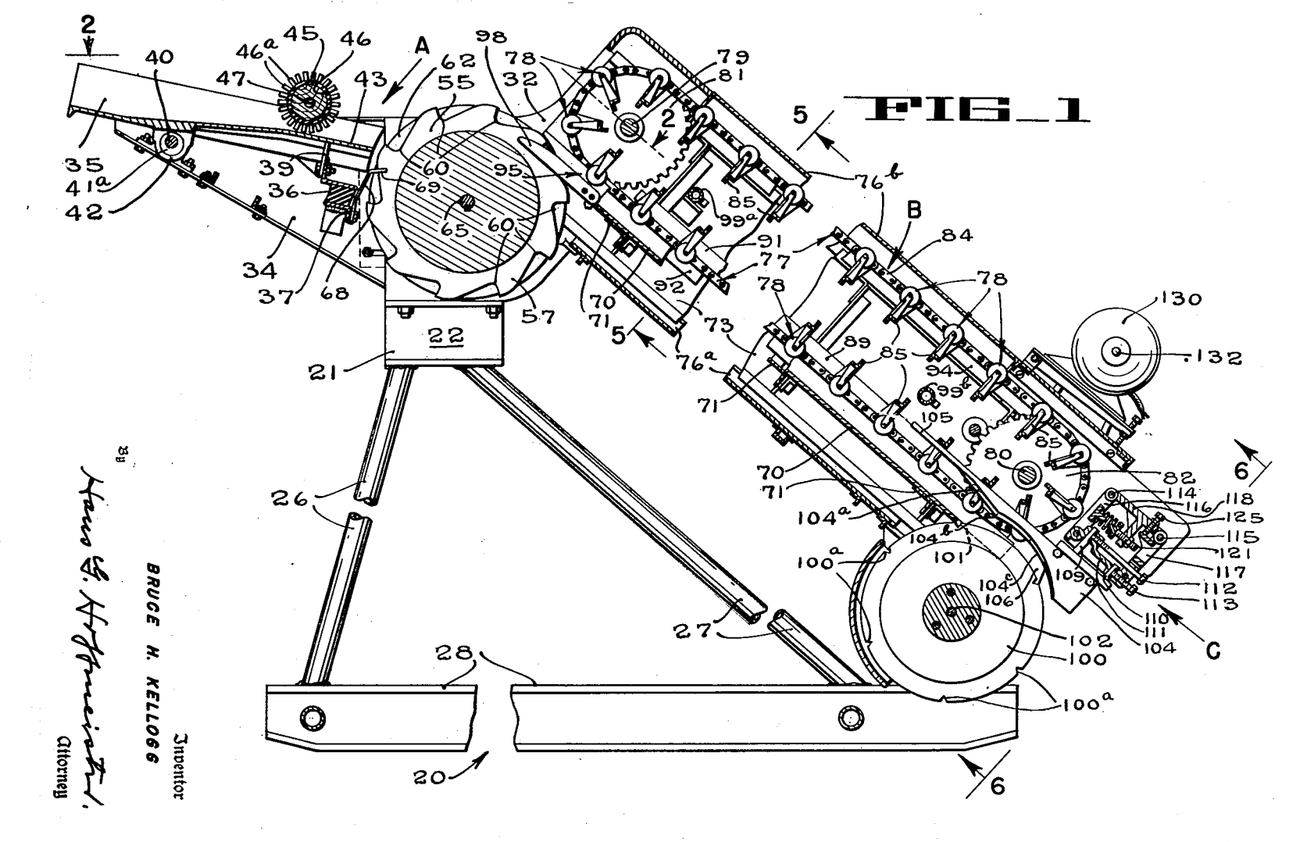
Figure 1 is a fragmentary longitudinal section of an apricot orienting and cutting machine embodying my invention.

Having first reference to Figure 1, the machine of the invention comprises a feed mechanism A adapted to receive the fruit in a promiscuous mass and to deliver it individually and in the proper intervals to the upper end of a downwardly slanting fruit orienting mechanism B. Said fruit orienting mechanism in turn delivers the fruit in properly aligned condition to a cutting and pitting mechanism C provided at its lower end. All said mechanisms are supported from a suitable pedestal 20 which comprises an elevated seat 21 that may be formed by a pair of short horizontally positioned channel irons 22 and 23 (Figures 1 and 4) arranged in parallel spaced relation. Each of said channel irons rests upon two oppositely tilted legs 24, 25 and 26, 27, respectively, that are suitably anchored in a base 28 constituted by a pair of elongated channel irons disposed parallel to the short channel irons 22 and 23.

Bolted to the channel irons 22, 23 are two brackets 31 and 32 (Figures 1 and 4) and suitably secured to the front or fruit entrance ends of said brackets are two triangular consoles 33 and 34, respectively. Disposed intermediately of said consoles is an inclined feed trough 35 which is supported for oscillatory movement in any suitable manner, such as by means of a rubber bond 36 interposed between a shelf 37 supported from the consoles 33, 34 and a bracket 39 that is attached to the bottom of the trough 35, as shown in Figure 1. Means are provided to oscillate the feed trough and for this purpose a transverse shaft 40 suitably journaled in the consoles 33, 34 below the fruit entrance end of the feed trough carries two axially aligned eccentrics 41a and 41b (Figure 2) that turn in bearings 42 secured to the bottom of trough 35, as shown in Figure 1. Thus, whenever rotary motion is imparted to the shaft 40 the eccentrics 41a and 41b impart a rocking and reciprocating motion to the trough 35 that causes fruit delivered onto its elevated end to gravitate toward its lower end.

Figure 2:
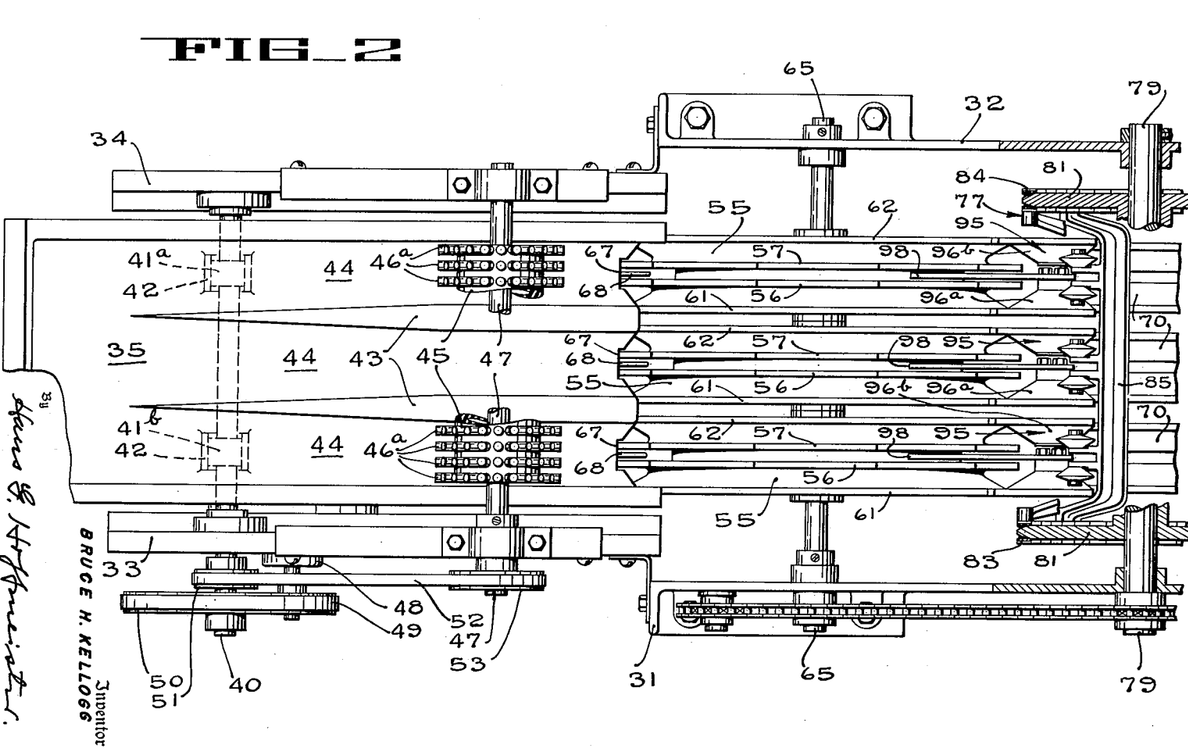
Figure 2 is a plan view partly in section of the feed end of the machine seen in the direction of the arrows 2—2 in Figure 1.

Longitudinal ribs 43 are formed in the floor of the trough 35, as best shown in Figure 2, and divide said trough into a plurality of adjacent channels 44, each adapted to accommodate a single file line of fruit. A brush 45 formed by a cylinder 46 provided with numerous radial protuberances or fingers 46a of elastic material, such as rubber, extends transversely across the trough 35 near the lower end thereof and may be mounted upon a transverse shaft 47 that is rotatably supported from the consoles 33 and 34. Said brush is mounted sufficiently high above the trough 35 to leave between the points of its elastic protuberances 46a and the bottom of the trough an open space that will readily pass a single layer of fruit. During operation of the machine said brush 45 is rotated in clockwise direction, as viewed in Figure 1, and as the rocking motion of the trough 35 causes the fruit to advance through the channels 44 in individual columns from the upper to the lower ends thereof, the elastic fingers of the brush 45 engage and reject all but the lowermost layer of fruit. As a result thereof fruit delivered in a promiscuous mass into the trough 35 at the upper end thereof arrives at the lower end of said trough in a single layer divided into as many parallel single file columns as there are channels formed in the bottom of the trough.

Both, the oscillating mechanism of the trough 35 and the rotary brush 45, may be driven from a common source of power. Having specific reference to Figure 4, the drive shaft of a motor 48 suitably supported from the consoles 33 and 34 is operatively connected through a belt 49 with a large pulley 50 that is keyed to the transverse shaft 40 which carries the eccentrics 41a and 41b. Likewise keyed to said shaft 40 is a small pulley 51 which is operatively connected through a belt 52 with another pulley 53 that is firmly mounted upon the aforementioned shaft 47 which carries the rotary brush 45.

Figure 3:
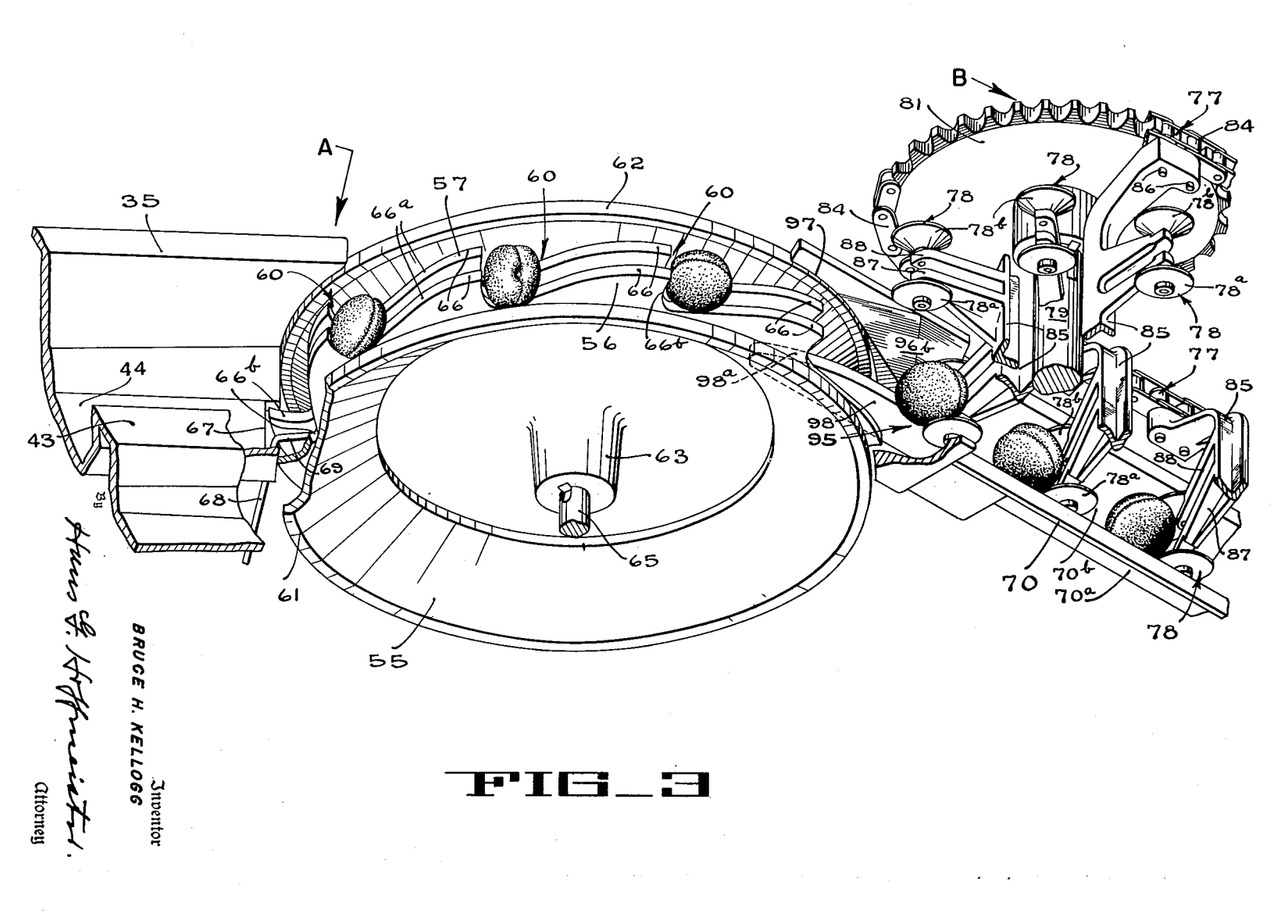
Figure 3 is an enlarged fragmentary perspective of said feed end.
Figures 3A, 9, 10, 11, 12:
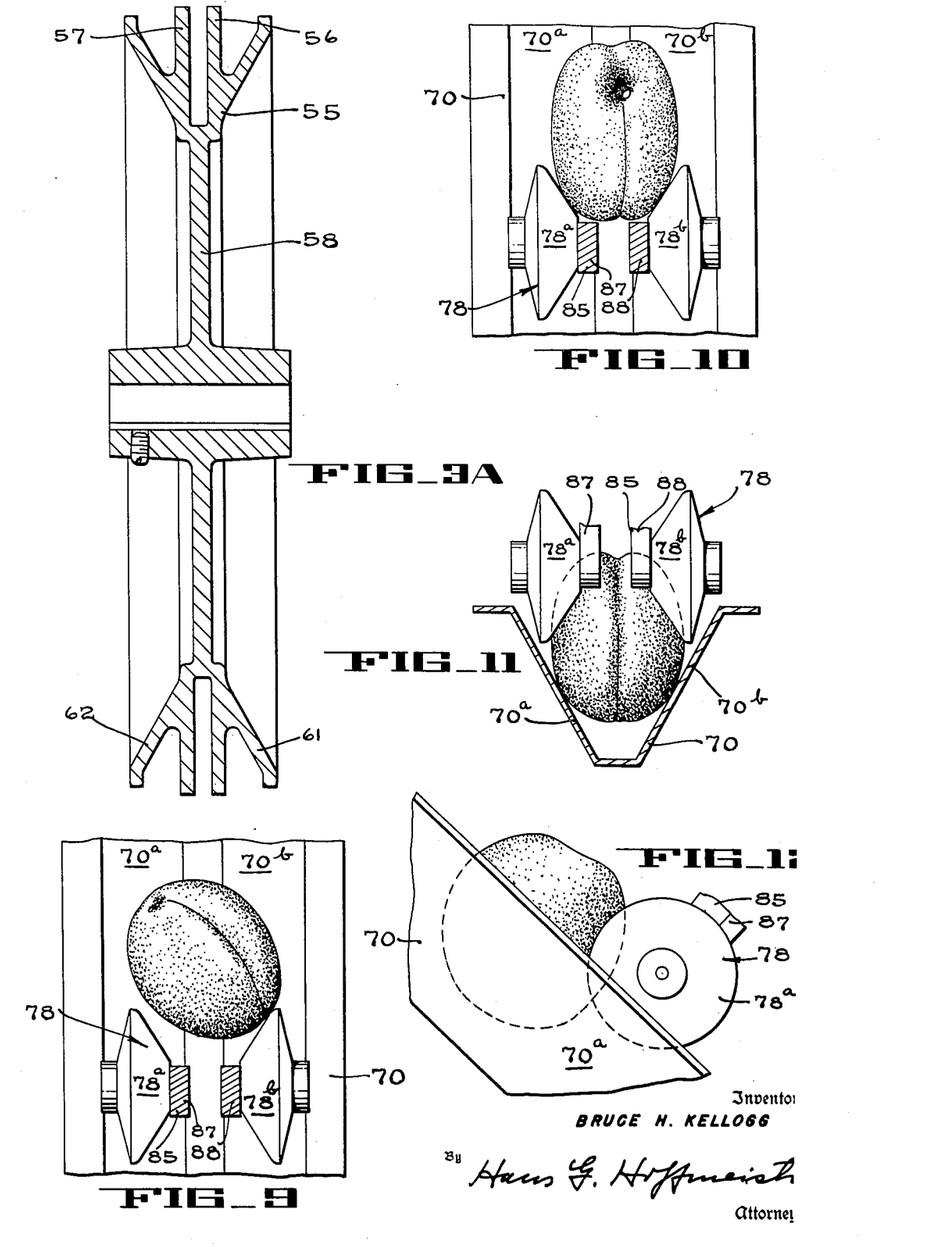
Figure 3a is an enlarged detail view illustrating a component of the feed mechanism of the machine in cross section.
Figure 9 is an enlarged plan view which illustrates a misaligned fruit in the process of orientation.
Figures 10, 11 and 12 are enlarged detail views illustrating a fruit situated in aligned position within the orienting mechanism of the invention, by way of a plan view, a front elevation and a side elevation respectively.
Figures 4, 5:
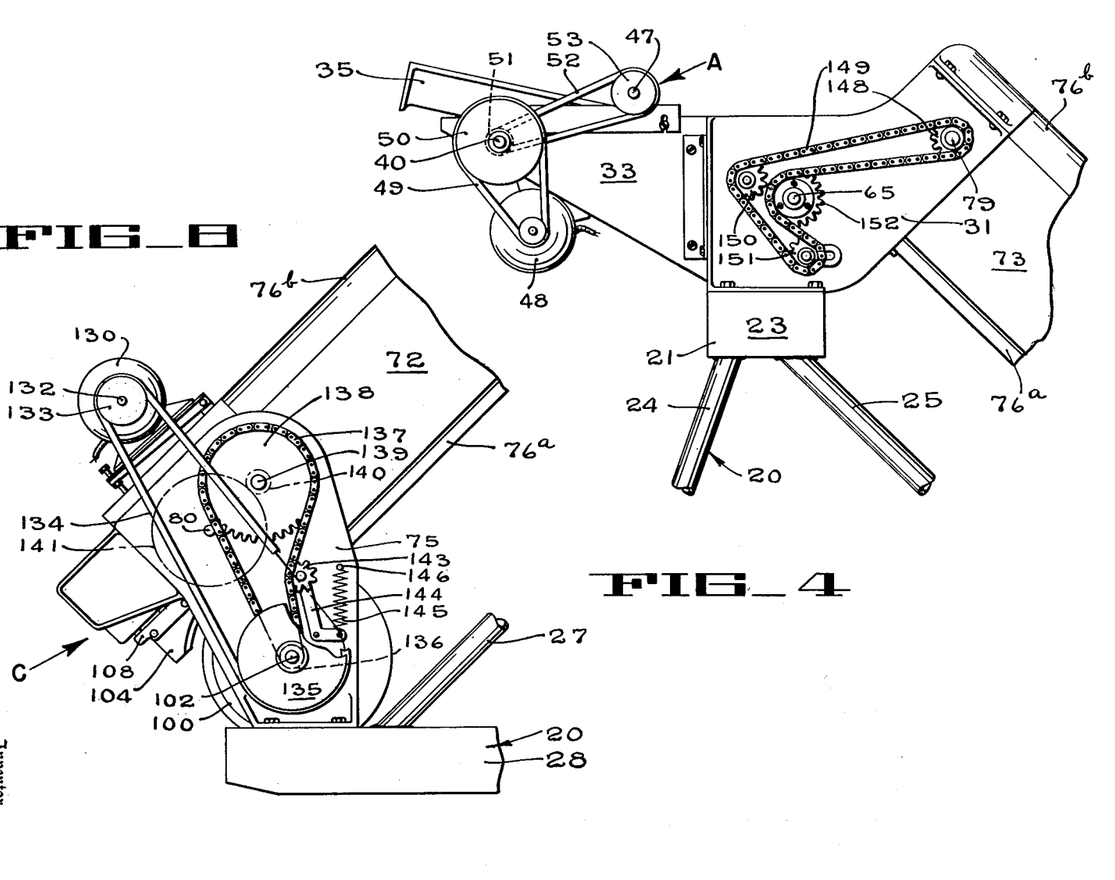
Figure 4 is a fragmentary side elevation of the feed end of the machine viewed in the same direction as Figure 1.
Figure 5 is an enlarged cross section through the machine taken along line 5—5 of Figure 1.
Figure 5:
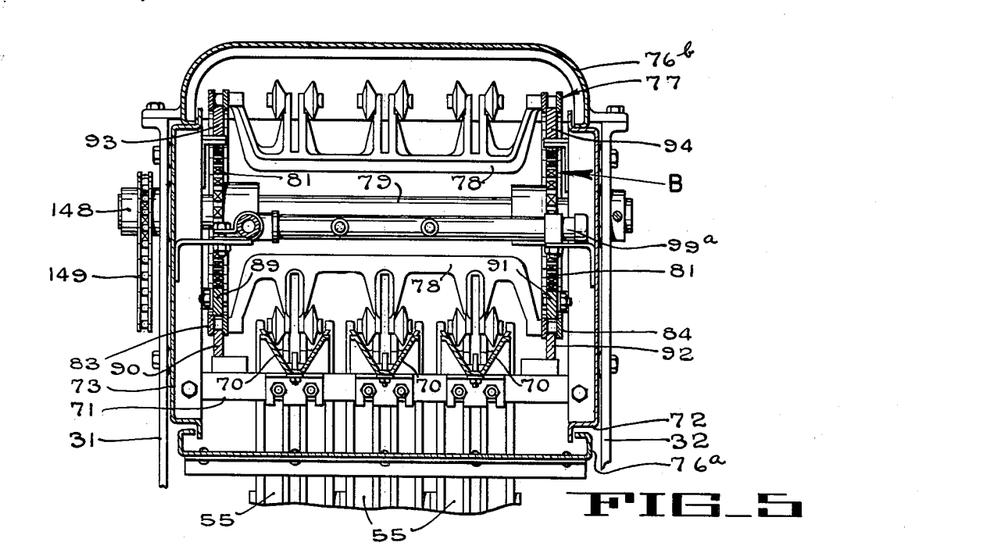

Located adjacent to the lower end of each of the channels 44 formed in the floor of the feed trough 35 is a transfer wheel 55 that is arranged to transfer fruit individually and at the proper intervals from its associated channel onto the entrance end of a corresponding one of the orienting units comprised in mechanism B. Each of said transfer wheels comprises a pair of axially spaced vertical flanges 56 and 57 which have saw-toothed edges and are mounted in angularly aligned position upon a common disc 58, Fig. 3a. The saw-toothed edges of said flanges 56 and 57 form an endless sequence of pockets 60 of sufficient radial depth and axial width to accommodate single specimens of whatever fruit is to be processed in a particular machine (Figure 3) and a pair of outwardly flared peripheral flanges 61 and 62 arranged at either side of the saw-toothed flangse 56 and 57 are likewise supported from the disc 58 and form guide surfaces that maintain the fruit within the pockets 60 during transfer from the trough 35 onto the orienting mechanism proper. The center of the disc 58 is formed into a hub 63 and the hubs 63 of all the transfer wheels 55 are jointly mounted upon a common transverse drive shaft 65 which is suitably journaled in the previously mentioned brackets 31 and 32 (Figures 1, 2 and 4). Said shaft 65 is operated in clockwise direction, as viewed in Figures 1 and 3, so that the upper segments of the wheels 55 move from the end of the feed trough 35 toward the entrance of the orienting mechanism proper, and in order that the transfer wheels 55 may properly lift the fruit from the feed trough 35, said trough is so positioned as to feed into the left upper sector of said wheels, and the transfer wheels in turn are arranged to pass with their teeth 66 (Fig. 3) through suitable recesses 67 provided in the ends of the individual trough channels 44.

During operation of the machine small specimens of fruit may drop into the gaps that form continually between the recessed rear edges of the trough 35 and the receding edges 66a of the transfer teeth 66. When the steep leading edges 66b of the next set of transfer teeth engage such mispositioned fruit, said fruit may be pushed against the edge of the trough and thus come to harm or may kick the directly succeeding fruit in the solid fruit column descending through the particular channel 44, out of and above the level of said column and thus defeat the purpose of the above described rotary brush 45. To prevent such accidents a finger 68 suitably supported from the aforementioned shelf 37 may be arranged to rise to about the level of the trough 35 where its upper end 69 is turned to project into the space between the saw-toothed edges 56 and 57. Thus, all fruit no matter how small will be maintained at about the level of the trough 35 until the leading edges 66b of the next pair of teeth arrive and lift it from said trough.

Figure 6:
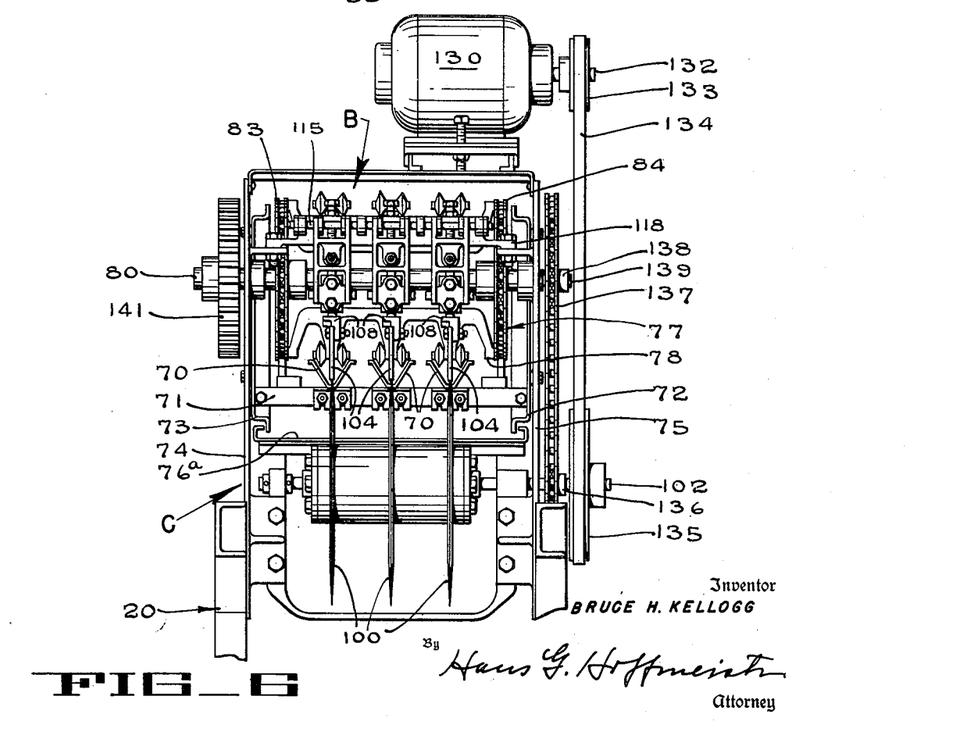
Figure 6 is an enlarged rear elevation of the machine viewed in the direction of the arrows 6—6 shown in Figure 1.

The orienting mechanism B of my invention comprises a number of inclined chutes 70 of V-shaped cross section, one associated with each of the above described transfer wheels 55. Said chutes extend from said wheels all the way down to the slicing and pitting mechanism C at sufficiently steep an angle to cause fruit deposited into said chute at the upper end thereof to tumble down said chute without need for a propelling force other than gravity. In the particular embodiment of the invention illustrated in the accompanying drawings, the chutes 70 rest upon a plurality of cross members 71 that in turn are suitably supported from two vertically positioned panels 72 and 73 (Figure 5). The upper ends of said panels may be secured to the previously mentioned brackets 31 and 32, respectively, while their lower ends are suitably supported from another pair of brackets 74 and 75 that rise from and are bolted to the base 28 of the pedestal 20 (Figures 6 and 8). Arranged below and parallel to the chutes 70 is an inclined trough 76a that is likewise supported from the side brackets 31, 32 and 74, 75, and a top panel 76b disposed above the side panels 72 and 73 completes the housing within which the orienting mechanism is encased.

Means are provided to regulate the downward movement of the fruit through the inclined chutes 70 with a minimum of hindrance to the free revolvability thereof. For this purpose an endless conveyor 77 located within the described housing is arranged to move along the diverging upper sides of each of the chutes 70. The conveyor 77 carries an endless sequence of longitudinally spaced elements 78, against which the fruit may lean and which control the speed at which the fruit descends through said chutes. Having specific reference to Figure 1, upper and lower transverse shafts 79 and 80, respectively, are suitably journaled in the aforementioned upper and lower side brackets 31, 32 and 74, 75, respectively, and keyed upon said shafts are pairs of transversely spaced sprockets 81 and 82, respectively, around which are trained two endless sprocket chains 83 and 84. At equal intervals said chains are connected by yoke shaped members 85 attached at either side to two consecutive pivots 86 of the sprocket chains 83 and 84, respectively (Figures 3 and 7), so that they may at all times retain a predetermined position normal to the surface determined by the sprocket chains. In vertical alignment with each of the chutes comprised in the orienting mechanism of my invention, said yokes 85 form pairs of transversely spaced arms 87 and 88 which extend normal to the surface determined by the sprocket chains. Pivoted to said arms for free and independent rotational movement about a common transverse axis situated within the surface determined by the sprocket chains are two opposed conical rollers 78a and 78b, respectively. During performance of the machine the conveyor 77 is operated in counterclockwise direction, as viewed in Figure 1, causing the elements 78 to travel downwardly through and along the diverging upper sides of the chutes 70 from the upper to the lower ends thereof and thereafter to return to the upper ends of said chutes for renewed travel therethrough. In order that the sprocket chains 83, 84 may hold the elements 78 at precisely the proper level relative to their co-acting orienting chutes 70 throughout the total distance of their travel along said chutes, the lower longitudinal runs of said sprocket chains may be arranged to roll between upper and lower guide rails 89, 90 and 91, 92, respectively, that are suitably supported from the previously mentioned side panels 72 and 73, as shown in Figure 5. Similarly, another set of guide rails 93 and 94 suitably supported from the side panels 72 and 73, respectively, may prevent sagging of the upper runs of said sprocket chains 83, 84, as likewise shown in Figure 5.

The transfer wheels 55 and the conveyor 77 are operatively synchronized in such a manner that each of the pockets 60 of said transfer wheels will deposit entrained fruit into an orienting chute 70 directly behind one of the elements 78. To effect smooth transfer of the fruit from the transfer wheels 55 to the upper ends of the orienting chutes 70 without danger of cutting, bruising, or crushing the fruit against the front edges of said chute, a bridge or transition element 95 may be interposed between each of the transfer wheels 55 and their correlated orienting chutes 70. Each of said bridge or transition elements 95 has basically the form of a chute segment, the entrance end of which is equal or slightly larger in width than the space determined by the guide flanges 61, 62 of the transfer wheels 55, while its discharge end is equal to or slightly narrower than the width of the orienting chute to which it is connected, the described reduction in width being effected over a pair of smooth slide areas 96a and 96b that converge in transverse as well as in downward direction, as best shown in Figures 2 and 3. The side walls of each of said transition elements may be arranged to overlie and conform with the circular flanges 61, 62 of the transfer wheels, as shown at 97 (Figure 3), and the bottom of said elements may be formed by a forwardly projecting tongue 98. Said tongue has a smoothly curved end 98a that reaches into the space between the saw-toothed flanges 56, 57 below the level of the pockets 60 and thus lifts the fruit from the approaching pockets and guides it safely into the orienting chute in such a manner that it will at no time encounter any edges that may bruise it or slit its skin.

An apricot or like ovaloidal fruit delivered into one of the orienting troughs 70 in the described manner tumbles under the force of gravity downwardly through said trough but encounters an element 78 which controls the speed of its further descent according to the speed with which the endless conveyor 77 is operated. When a fruit descends through a chute while leaning against a support 78, the force of gravity will cause said fruit to seek its lowest position within the confines of the converging chute walls 70a and 70b and the converging surfaces formed by the oppositely tapered rollers 78a and 78b of the retarder element. The lowest position which a fruit of ovaloidal shape may assume within the defined boundaries is a position in which its smallest diameter lies transversely to the common plane of symmetry of the chute and the retarder element, while the largest meridional circles of the fruit surface lie parallel to said plane of symmetry, as shown in Figures 10, 11 and 12. In such a position the suture plane of the fruit coincides substantially with said plane of symmetry, for the suture membrane of apricots and like ovaloidal fruit is usually situated between, and parallel to, the largest meridional circles of its surface. In the described orienting mechanism the combination of an inclined trough which presents a pair of converging surfaces to the fruit, with a control element of the type described which presents another pair of converging surfaces to the fruit as it descends through the trough, utilizes the force of gravity in such a manner as to exercise a two-fold steering effect upon the fruit that acts at two different zones of the fruit surface which are angularly displaced from one another within the plane of rotation of the descending fruit. As a result thereof misaligned fruit, such as illustrated in Figure 9, is urged into the properly aligned position illustrated in Figures 10, 11 and 12, in much shorter time and with a much higher degree of certainly than possible if the trough alone were employed. Moreover, once the fruit has been properly aligned, said two pairs of converging surfaces are effective to stabilize the oriented position of the fruit against any tendency of said fruit to wander laterally out of alignment which may be caused by local variations in the fruit surfaces, such as local hardness or softness, uneven surface formations and the like. To enable the descending fruit to follow readily the steering forces exerted thereupon by the two pairs of converging surfaces, the orienting mechanism of the invention is arranged in such a manner that any resistance offered by the surfaces of the chute walls or the conical rollers of the control elements to the free revolvability of the fruit is held at a minimum. For this purpose the conical orienting rollers 78a and 78b are mounted for free rotation independently from one another, as previously pointed out, so that they can follow individually any movement of whatever part of the fruit surface may contact them. In addition two manifolds 99a and 99b may be arranged transversely above the chutes 70 and the lower run of the conveyor 77 near the upper and lower ends thereof (Figures 1 and 5) from which a spray of a suitable lubricating liquid, such as water, is continuously directed onto the speed regulating elements and the chutes underneath to maintain them in slippery condition and free from any tackiness such as might develop as a result of juice oozing from the processed fruit.

Figure 7:
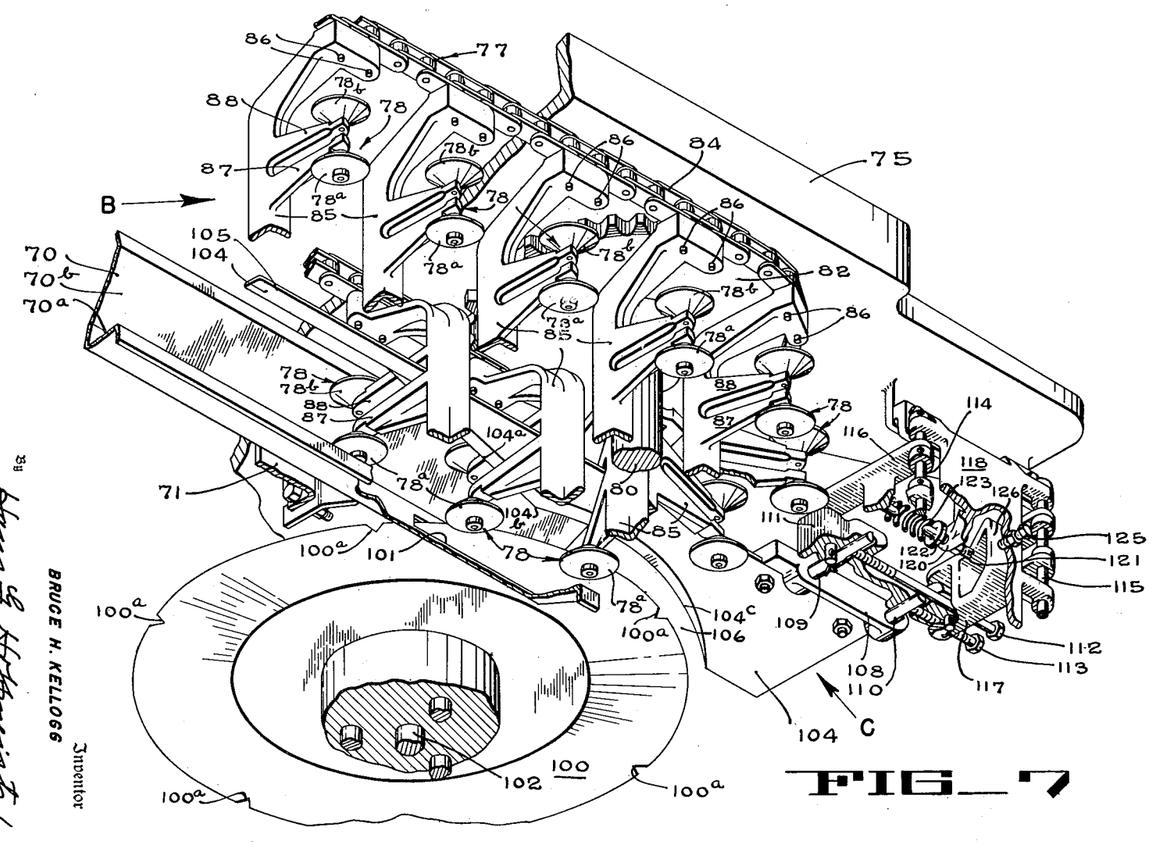
Figure 7 is an enlarged fragmentary perspective of the discharge end of the machine.

Arranged at the lower end of each orienting chute 70 within the plate of symmetry thereof is a circular knife 100 which protrudes with its upper segment through a slot 101 provided in the bottom of each orienting chute, as best shown in Figure 7. All three of the knives 100 are mounted in properly spaced relation upon a common rotary shaft 102 (Figure 6) that extends transversely to said chutes and is suitably journaled in the lower side brackets 74 and 75 (Figure 8). Supoprted above and within the plane of each of said rotary knives is a slender stationary blade 104. Said blade has an elongated front portion 105 that is arranged sufficiently high relative to its associated orienting chute to overhang an approaching fruit. In addition said front portion 105 is sufficiently long to extend at all times through several of the spaces between the supporting arms 87 and 88 of the approaching speed-regulating elements 78. A plurality of apricots or like fruit when impaled upon a slender blade of the type illustrated may bend said blade laterally out of its proper plane during the cutting operation and may cause the machine to break down if the blade is bent far enough for its point to strike against the arms 87 or 88 of the approaching speed-regulating elements 78. By elongating the front portion of the knife 104 in the described manner materially beyond the point where its edge is first engaged by the fruit, the approaching arms 87, 88 are made to act as guides that maintain the point of the blade in properly centered position and thus keep warping of the intermediate portions of the knife within permissible limits. Adjoining said forwardly directed guide portion 105 the blade 104 increases gradually in vertical depth so as to form a cutting edge 104a that intersects obliquely the path of the approaching fruit at a point ahead of the range of action of the circular knife 100 (Figure 7). In this manner a fruit delivered against the blades 100 and 104 in oriented condition may be securely impaled upon the edge 104a of the stationary knife before its orientation can be disturbed by the motion of the rapidly spinning knife 100.

The oblique edge 104a of the stationary knife 104 descends to a point 104b where it is still sufficiently high above the co-acting upper segment of the rotary knife 100 to leave a gap between said knives that is wide enough to receive a fruit pit of maximum size. Behind point 104b, however, the cutting edge of the stationary knife 104 assumes the shape of a shallow arc 104c that leaves a gradually converging channel 106 between the two co-acting knife blades (Figures 1 and 7) through which the fruit pit may travel as the fruit is forced through said knives. Thus, small-sized fruit will dependably be severed into its natural halves, though it may have pits that are appreciably smaller than the pits for which the gap at point 104b is designed. In practical operation of the machine fruit may stick in semi-severed condition to the upper knife 104, instead of passing through the slicing knives and soon a whole row of fruit may congest the described slicing mechanism. To make it easier for such fruit jams to be pushed fully through the slicing mechanism, the upper knife 104 may be arranged to yield resiliently away from the lower knife and for this purpose its rear end may be bolted to a hilt 108 (Fig. 7) provided with two upwardly projecting studs 109 and 110 that are slidably received in suitable apertures provided in a carrier plate 111 where they are adjustably held by means of two set screws 112 and 113, respectively, that are accessible from the rear of the machine. The carrier plate 111 is pivotally supported from a pair of transversely positioned parallel hinge rods 114 and 115 by two link members 116 and 117, respectively, that are pivotally connected to the front and rear ends of said plate. Said rods in turn are journaled in a horizontal shelf 118 that extends between and is rigidly supported from the side brackets 74 and 75. Depending from said shelf is a stationary septum 120 through which extends a set screw 121 that is accessible for adjustment from the rear of the machine. Arranged between the rear surface of the front link 116 and a disc 122 mounted upon the forwardly projecting end of said set screw 121 is a compression spring 123 that urges the link member 116 and hence the carrier plate 111 and the rearwardly positioned link member 117 in forward direction. Forward motion of said members and hence of the cutting blade 104 supported therefrom is positively limited, however, by a set screw 125 extending through the shelf 118, which screw is accessible for adjustment from the top and bears against a stop ledge 126 projecting forwardly from the rearwardly positioned link member 117.

The described arrangement permits manual adjustment of the initial position of the stationary knife 104 relative to the rotary knife 100 by manipulation of the set screw 125 which adjusts the extreme forward position that the knife 104 may assume under the force of the compression spring 123. In addition the vertical position of the knife 104 may be adjusted by loosening the set screws 112 and 113 and positioning the studs 109, 110 of the knife-carrying hilt 108 higher or lower within the carrier plate 111. Whenever during practical operation of the machine a row of fruit congests the channel 106 to an extent where the last of said row remains in the path of the speed-regulating elements 78, the next such element engages said last fruit and positively advances said fruit and all the fruit ahead of it. In such instances the described mounting arrangement of the upper blade 104 permits said blade to yield away from the rotary blade 100 which widens the channel 106 and makes it easier for the fruit jam to pass through the slicing mechanism 100, 104. By manipulation of the set screw 121 the strength of the compression spring 123 and hence the ease with which the knife will yield, may be varied to adjust the machine to different operating conditions, such as are presented by different types of fruit.

Apricots are so constituted by nature that the fruit portions at either side of the pit are not firmly connected to the pit; in fact the only firm connection between the pit and the fleshy fruit portions is usually formed by some stem fibers at the stem end of the fruit. Said stem end lies within the suture plane of the fruit and consequently when fruit properly oriented in the preivously described manner is thoroughly circumcised by the two blades 100 and 104 within a plane that coincides with the major perimeter of the pit, the two halves of the fruit will usually fall laterally away from the pit. In order that the two co-acting knives may properly cut around the total fruit circumference, it is necessary that the fruit in passing through the described slicing mechanism rotates within the plane of said knives. To promote such rotation of the fruit the edge of the rotary knife 100 may be provided with a number of peripherally spaced notches 100a which impart to the fruit an increased rotational effort in a direction opposite to the direction of movement of the rotary knife. As an added advantage said notches may engage fruit pits and tear them from the flesh of the fruit if part of the fibrous connection between the fruit and its pit should have escaped the cutting action of the knives. The fruit halves and the pits dropping from the discharge end of the machine may be collected on suitable sifting screens (not shown) that separate the smaller pits from the larger fruit halves.

For proper performance of the described machine, the transfer wheels 55 and the conveyor 77 from which the fruit positioning elements 78 are supported, must be operated in timed relation, as previously pointed out, in order that each of said transfer wheels will deposit fruit at the upper end of its associated orienting chute 70 directly after a fruit positioning element 78 has entered said chute and before the directly succeeding fruit positioning element approaches said chute end too closely to permit the fruit to enter the chute. For this purpose the transfer wheels 55 and the conveyor 77 are preferably operated from a common source of power. In the particular embodiment of the invention, as illustrated in the accompanying drawings, a motor 130 is mounted upon the top panel 76b of the fruit orienting mechanism B and is arranged to drive not only the transfer wheels 55 and the conveyor 77 but also the rotary knives 100. Having reference to Figures 6 and 8, said motor has keyed upon its power shaft 132 a pulley 133 that is operatively connected by a belt 134 with a pulley 135 which is keyed upon the drive shaft 102 of the rotary knives. Likewise, keyed upon said drive shaft 102 is a small sprocket 136 that is operatively connected by a sprocket chain 137 with a large sprocket 138 keyed to an idler shaft 139 which is suitably journaled in the lower side brackets 74 and 75. Keyed to the same shaft 139 is a small gear 140 that meshes with a large gear 141 which is firmly mounted upon the previously mentioned shaft 80 that carries the lower sprockets 82 of the conveyor 77. The described train of pulleys and gears imparts high rotational speed to the circular knives 100 but reduces said speed sufficiently to operate the conveyor 77 at a rate that will allow sufficient time for fruit bearing against the elements 78 to be properly oriented before it reaches the cutting knives at the end of the orienting chutes 70. To take up any slack that may develop in the sprocket chain 137 during prolonged operation of the described mechanism, a small sprocket 143 is urged against the outer periphery of said chain, as shown in Figure 8. Said sprocket is rotatably supported from one arm of a bell crank lever 144 pivoted to the side bracket 75 and a spring 145 tensioned between the other arm of said bell crank and a suitably positioned stud 146 mounted in the bracket 75 urges said lever in counterclockwise direction, as viewed in Figure 8, and thus presses the sprocket 143 against the outer periphery of the sprocket chain 137. Keyed to the shaft 79 which rotates with the upper conveyor sprockets 81, is a small sprocket 148 (Figure 4). A sprocket chain 149 trained around said sprocket is arranged by means of two idler sprockets 150 and 151 to engage a sprocket 152 with its outer periphery so that the rotary power transmitted through said sprocket chain from the sprocket 148 to the sprocket 152 is reversed in direction. Said sprocket 152 is mounted upon, and drives, the shaft 65 that carries the transfer wheels 55, and hence said transfer wheels will move in clockwise direction, as viewed in Figures 1, 3 and 4, whenever the conveyor 77 moves in counterclockwise direction. The sprocket 152 is preferably secured to the actuator shaft 65 of the transfer wheels in such a manner that its position relative to said shaft can readily be rotatively adjusted, so that the initial position of the pockets 60 in the transfer wheels 35 may be properly related to the position of the speed control elements 78 supported from the conveyor 77.

While I have explained my invention with the aid of an exemplary embodiment, it will be understood that I do not wish to be limited to the particular constructional details illustrated and described which may be departed from without departing from the scope and spirit of my invention.

What I claim is:

1. Mechanism for orienting ovaloidal fruit, such as apricots and the like, comprising an inclined chute having converging side walls adapted to receive the fruit, and an element operably mounted for downward movement along said chute and having rearwardly diverging surfaces adapted to support the fruit during said downward movement.

2. Mechanism for orienting ovaloidal fruit, such as apricots and the like, comprising an inclined chute having converging side walls adapted to receive the fruit, and an element operably mounted for downward movement along said chute at a speed adapted to control the rate of descent of the fruit through said chute and having rearwardly diverging surfaces for supporting the fruit during said downward movement.

3. Mechanism for orienting ovaloidal fruit, such as apricots and the like, comprising an inclined fruit guiding chute of V-shaped cross section, and an element operably mounted for downward movement along said chute and having two opposed conical surfaces adapted to support the fruit during said downward movement.

4. Mechanism for orienting ovaloidal fruit, such as apricots and the like, comprising an inclined fruit guiding chute of V-shaped cross section, and an element operably mounted for downward movement along said chute and having two opposed cones mounted for individual rotation about a common horizontal axis and adapted to support the fruit during said downward movement.

5. Mechanism for orienting ovaloidal fruit, such as apricots and the like, comprising an inclined fruit guiding chute of V-shaped cross section, and fruit supporting means operably mounted above said chute and arranged to move downwardly therealong at a speed adapted to control the rate of descent of fruit therethrough and including a pair of opposed conical members loosely mounted for individual rotation about a common horizontal axis.

6. Orienting mechanism for ovaloidal fruit, such as apricots, comprising an inclined fruit guiding chute, and rotatable spool-like fruit supporting means operably mounted above said chute and arranged to move downwardly therethrough at a speed adapted to retard the free descent of fruit deposited therein.

7. Orienting mechanism according to claim 6 wherein said spool-like fruit supporting means is composed of two oppositely tapering conical rollers loosely mounted for independent rotation about a common horizontal axis.

8. Mechanism for orienting ovaloidal fruit, such as apricots, comprising an inclined chute having downwardly converging fruit guiding side walls, and a rotatable fruit supporting member operably mounted adjacent said chute and arranged to move downwardly therethrough at a speed adapted to retard the free descent of fruit deposited into said chute.

9. Mechanism for orienting ovaloidal fruit, such as apricots, comprising an inclined chute having downwardly converging fruit guiding side walls, an endless conveyor arranged with a run disposed in contiguous parallel relation to said chute and for downward movement therealong, and a number of control fruit control elements supported from said conveyor with their horizontal axes disposed in transverse relation to the direction of movement thereof, each of said elements comprising a pair of oppositely tapering conical rollers mounted for free rotation about their axes and with their apices towards each other.

10. Mechanism for orienting ovaloidal fruit, such as apricots, comprising an inclined fruit guiding chute of V-shaped cross-section, an endless conveyor having a run extending parallel and adjacent to the open top of said chute and aranged to move downwardly therealong, pairs of transversely spaced arms supported from said conveyor, and opposed conical rollers supported for free rotation from each of said arms adapted to align the suture plane of fruit deposited into said chute substantially with the vertical plane of symmetry of same.

11. Mechanism for slicing ovaloidal fruit, such as apricots, into their natural halves, comprising an inclined fruit guiding chute, fruit support means adapted to align and control the rate of descent of the fruit within said chute, a rotary slicing knife arranged at the lower end of the chute in the vertical plane of symmetry thereof, and an elongated slicing knife blade disposed above and spaced vertically from said chute and rotary slicing knife for cooperation with the rotary slicing knife in the slicing of the fruit and for maintaining the alignment of the fruit during the slicing operation.

12. Mechanism for slicing ovaloidal fruit, such as apricots, into their natural halves, comprising an inclined fruit guiding chute of substantially V-shaped cross-section having a longitudinal slot in its bottom at its lower end, fruit support means adapted to align and control the rate of descent of the fruit within said chute, a circular knife mounted for rotation at the lower end of said chute within the plane of symmetry thereof and extending with its upper segment through said slot, and a stationary knife arranged within said plane of symmetry and spaced from said circular knife in a direction normal to the inclination of the fruit guiding chute, said stationary knife being arranged to present a cutting edge toward said chute at a point ahead of said circular knife to impale the aligned fruit arriving at the lower end of the chute before it comes into contact with said circular knife and thus stabilize the alignment of the fruit established in the chute.

13. Mechanism for slicing ovaloidal fruit, such as apricots, into their natural halves, comprising an inclined fruit guiding chute, fruit support means adapted to align and control the rate of descent of the fruit within said chute, a rotary knife arranged at the lower end of the chute in the vertical plane of symmetry of same, and a stationary knife arranged within said plane of symmetry and spaced from said rotary knife in a direction normal to the inclination of the chute, said stationary knife being arranged to present an oblique cutting edge toward said chute at a point ahead of said rotary knife to impale fruit arriving at the lower end of the chute and thus stabilize its alignment before said fruit comes into contact with said rotary knife.

14. Arrangement according to claim 13 wherein said stationary knife has an arcuate cutting edge located rearwardly of said oblique cutting edge and arranged to form a rearwardly converging channel with the adjacent segment of said rotary knife, and wherein said stationary knife is arranged to yield away from said rotary knife.

15. Arrangement according to claim 13 wherein the circular cutting edge of said rotary knife possesses a plurality of circumferentially spaced notches.

References Cited in the file of this patent

UNITED STATES PATENTS

| Number | Name | Date |
| --- | --- | --- |
| 553,649 | Harpold | Jan. 28, 1896 |
| 1,365,129 | Thornton | Jan. 11, 1921 |
| 1,365,166 | Garman | Jan. 11, 1921 |
| 1,392,519 | Paranteace | Oct. 4, 1921 |
| 1,421,207 | Garman | June 27, 1922 |
| 1,573,232 | Ehstrom | Feb. 16, 1926 |
| 1,624,175 | Nevills | Apr. 12, 1927 |
| 1,785,014 | Norgaard | Dec. 16, 1930 |
| 2,100,455 | Souther | Nov. 30, 1937 |
| 2,146,456 | Thompson | Feb. 7, 1939 |
| 2,205,397 | Drake | June 25, 1940 |
| 2,232,210 | Carroll | Feb. 18, 1941 |
| 2,259,332 | Winkelman | Oct. 14, 1941 |
| 2,296,645 | Marsden | Sept. 22, 1942 |
| 2,298,614 | Carroll | Oct. 13, 1942 |
| 2,313,898 | Silva | Mar. 16, 1943 |
| 2,324,470 | Burling | July 20, 1943 |
| 2,333,576 | Kerr | Nov. 2, 1943 |
| 2,341,857 | Drake et al. | Feb. 15, 1944 |
| 2,345,843 | Watkins | Apr. 4, 1944 |
| 2,456,031 | Spain | Dec. 14, 1948 |
| 2,471,479 | Coons | May 31, 1949 |
| 2,556,266 | Furtado | June 12, 1951 |